US010115990B2

(12) United States Patent
Kakeno et al.

(10) Patent No.: US 10,115,990 B2
(45) Date of Patent: Oct. 30, 2018

(54) FUEL CELL SYSTEM, FUEL CELL VEHICLE, AND METHOD FOR CONTROLLING FUEL CELL SYSTEM

(71) Applicant: TOYOTA JIDOSHA KABUSHIKI KAISHA, Toyota-shi, Aichi-ken (JP)

(72) Inventors: Yuji Kakeno, Nisshin (JP); Kenji Umayahara, Miyoshi (JP); Mitsuhiro Nada, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 147 days.

(21) Appl. No.: 14/932,698

(22) Filed: Nov. 4, 2015

(65) Prior Publication Data

US 2016/0141681 A1    May 19, 2016

(30) Foreign Application Priority Data

Nov. 14, 2014  (JP) ................................ 2014-231342

(51) Int. Cl.
*H01M 8/04* (2016.01)
*H01M 10/48* (2006.01)
(Continued)

(52) U.S. Cl.
CPC ..... *H01M 8/04753* (2013.01); *B60L 11/1883* (2013.01); *B60L 15/00* (2013.01);
(Continued)

(58) Field of Classification Search
CPC ......... H01M 8/04753; H01M 8/04611; H01M 8/04313; H01M 10/486; H01M 16/006; H01M 2220/20
See application file for complete search history.

(56) References Cited

U.S. PATENT DOCUMENTS

| 5,646,852 A * | 7/1997 | Lorenz .............. H01M 8/04089 |
| | | 429/430 |
| 2004/0013920 A1 | 1/2004 | Hasuka et al. |

(Continued)

FOREIGN PATENT DOCUMENTS

| DE | 103 32 129 A1 | 2/2004 |
| EP | 0633157 A1 | 1/1995 |

(Continued)

*Primary Examiner* — Osei K Amponsah
(74) *Attorney, Agent, or Firm* — Finnegan, Henderson, Farabow, Garrett & Dunner, LLP

(57) ABSTRACT

A fuel cell system installed in a vehicle includes a fuel cell that supplies power to a motor that drives the vehicle, a pump that supplies oxygen to the fuel cell, an accelerator position detector that detects an accelerator depression amount of the vehicle, and a controller that calculates required generated power of the fuel cell and required driving power of the pump, based on the accelerator depression amount. When a preset condition of causing a sharp drop in the calculated required generated power is satisfied, the controller calculates the required driving power in such a manner that a drop rate of the required driving power becomes higher than a drop rate of the calculated required generated power, sets a lower limit to the calculated required driving power, and drives the pump in accordance with the lower limit when the required driving power is lower than the lower limit.

6 Claims, 7 Drawing Sheets

(51) Int. Cl.
  *H01M 16/00*       (2006.01)
  *H01M 8/04746*     (2016.01)
  *H01M 8/04313*     (2016.01)
  *B60L 11/18*       (2006.01)
  *B60L 15/00*       (2006.01)
  *H01M 8/04089*     (2016.01)
  *H01M 8/04537*     (2016.01)

(52) U.S. Cl.
  CPC ... *H01M 8/04089* (2013.01); *H01M 8/04313* (2013.01); *H01M 8/04626* (2013.01); *H01M 10/486* (2013.01); *H01M 16/006* (2013.01); *H01M 2220/20* (2013.01); *H01M 2250/20* (2013.01); *Y02T 90/32* (2013.01)

(56) References Cited

U.S. PATENT DOCUMENTS

2009/0321163 A1   12/2009   Suzui
2011/0003223 A1   1/2011    Saeki
2011/0014536 A1   1/2011    Yoshida
2011/0293972 A1   12/2011   Naganuma et al.
2012/0007545 A1   1/2012    Yoshida et al.
2012/0021257 A1   1/2012    Yoshida et al.

FOREIGN PATENT DOCUMENTS

| | | | |
|---|---|---|---|
| EP | 1 897 165 | | 12/2006 |
| JP | 2004-071228 | * 3/2004 | .............. H01M 8/04 |
| JP | 2009-126258 A | | 6/2009 |
| JP | 2009-231223 | | 10/2009 |
| JP | 2010-238528 | | 10/2010 |
| JP | 2010-238630 | | 10/2010 |
| JP | 2011-015551 A | | 1/2011 |
| JP | 2011-15580 | | 1/2011 |
| JP | 2014-143105 A | | 8/2014 |
| KR | 10-1109066 B1 | | 1/2012 |
| WO | WO2006-134461 A1 | | 12/2006 |

* cited by examiner

FUEL CELL SYSTEM, FUEL CELL VEHICLE, AND METHOD FOR CONTROLLING FUEL CELL SYSTEM

CROSS-REFERENCE TO RELATED APPLICATION

This application claims priority to Japanese Patent Application No. 2014-231342 filed on Nov. 14, 2014, the entire contents of which are incorporated herein by reference.

BACKGROUND

Field

The present invention relates to a fuel cell system installed in a vehicle, a fuel cell vehicle, and a method for controlling the same.

Related Art

In some conventionally known fuel cell systems installed in a vehicle, required generated power of a fuel cell is calculated in accordance with an accelerator depression amount, and amounts of oxygen and hydrogen supplied to the fuel cell are controlled in such a manner that the power generated by the fuel cell matches the required generated power (JP-A-2011-15580). In the fuel cell system, when the required generated power of the fuel cell drops due to the deceleration of the vehicle or the like, required driving power of an air compressor that supplies oxygen to the fuel cell drops.

However, because the response of the air compressor is slow due to inertia, for example, when the required generated power sharply drops due to the sharp drop in the accelerator depression amount, oxygen is supplied to the fuel cell even after the required driving power drops to 0, until the compressor stops. Thus, there are a problem that dry up of the fuel cell occurs and a problem that excessively generated power leads to a lower fuel efficiency and over charging of a secondary battery. In view of the above, the present inventors have found out that the problems can be solved by performing such a control that the required driving power of the compressor drops at a higher drop rate than a drop rate of the required generated power when the required generated power sharply drops. However, when this control is performed, the required driving power drops to 0 before the required generated power does. Thus, the fuel cell might be unable to generate power due to the lack of oxygen after the compressor is stopped, and thus might fail to generate power corresponding to the required generated power. When this happens, there is a problem that the fuel cell system fails to supply the required power to a driving motor of the vehicle. As a result, the torque of the driving motor sharply drops, and thus what is known as torque shock occurs.

SUMMARY

The present invention is made to solve the problems described above, and thus can be implemented as the following aspects.

(1) One aspect of the present invention provides a fuel cell system installed in a vehicle. The fuel cell system includes a fuel cell that supplies power to a motor that drives the vehicle, a pump that supplies oxygen to the fuel cell, an accelerator position detector that detects an accelerator depression amount of the vehicle, and a controller that calculates required generated power of the fuel cell and required driving power of the pump, based on the accelerator depression amount. When a preset condition of causing a sharp drop in the calculated required generated power is satisfied, the controller calculates the required driving power in such a manner that a drop rate of the required driving power becomes higher than a drop rate of the calculated required generated power, sets a lower limit to the calculated required driving power, and drives the pump in accordance with the lower limit when the calculated required driving power is lower than the lower limit. In this configuration, when the required generated power sharply drops, the required driving power drops at the drop rate higher than the drop rate of the required generated power, whereby unnecessary supplying of oxygen to the fuel cell is prevented. Thus, dry up of the fuel cell can be prevented and the degradation of the fuel efficiency due to excessive generation of power can be reduced. When the calculated required driving power is lower than the lower limit, the pump is driven in accordance with the lower limit of the required driving power, whereby the fuel cell can be prevented from falling in a power generation disabled state due to the lack of oxygen. Thus, torque shock can be prevented from occurring when the vehicle is decelerating for example.

(2) In the fuel cell system according to the above-described aspect, the preset condition may be a drop rate of the accelerator depression amount being equal to or higher than a first threshold. In this configuration, a state where the required generated power sharply drops can be easily detected.

(3) The fuel cell system according to the above-described aspect may further include a secondary battery capable of supplying power to the motor, a vehicle speed detector that detects vehicle speed of the vehicle, and a state of charge detector that detects a temperature and a state of charge of the secondary battery. The controller may calculate an allowable output upper limit of the secondary battery based on at least one of the temperature and the state of charge of the secondary battery. The preset condition may be a drop rate of the accelerator depression amount being equal to or higher than a second threshold, the vehicle speed being equal to or lower than a third threshold, and the allowable output upper limit being equal to or lower than a fourth threshold. With this configuration, the state where the required generated power sharply drops can be easily detected, and the lower limit of the required driving power can be set only when power that can be supplied by the secondary battery to the motor is small and thus the torque shock is likely to occur.

(4) The fuel cell system according to the above-described aspect may further include a secondary battery capable of supplying power to the motor, and a state of charge detector that detects a temperature and a state of charge of the secondary battery. The controller may calculate the allowable output upper limit of the secondary battery based on at least one of the temperature and the state of charge of the secondary battery. The controller may calculates the lower limit of the required driving power based on the allowable output upper limit and the required generated power of the fuel cell. With this configuration, the lower limit of the required driving power can be changed in accordance with the magnitude of the power that can be supplied to the motor from the secondary battery. Thus, the fuel cell can be more effectively prevented from falling in the power generation disabled state due to the lack of oxygen. The lower limit of the required driving power can be changed in accordance with the magnitude of the required generated power of the fuel cell. Thus, the oxygen can be prevented from being excessively supplied to the fuel cell when the pump is driven in accordance with the lower limit.

The present invention may be implemented in various embodiments, for example, a vehicle including a fuel cell, a method for controlling a fuel cell system installed in a vehicle, a controller that executes the method, a computer program that executes the method, and a recording medium that records the computer program.

DESCRIPTION OF THE EMBODIMENTS

A. First Embodiment

Figure 1:
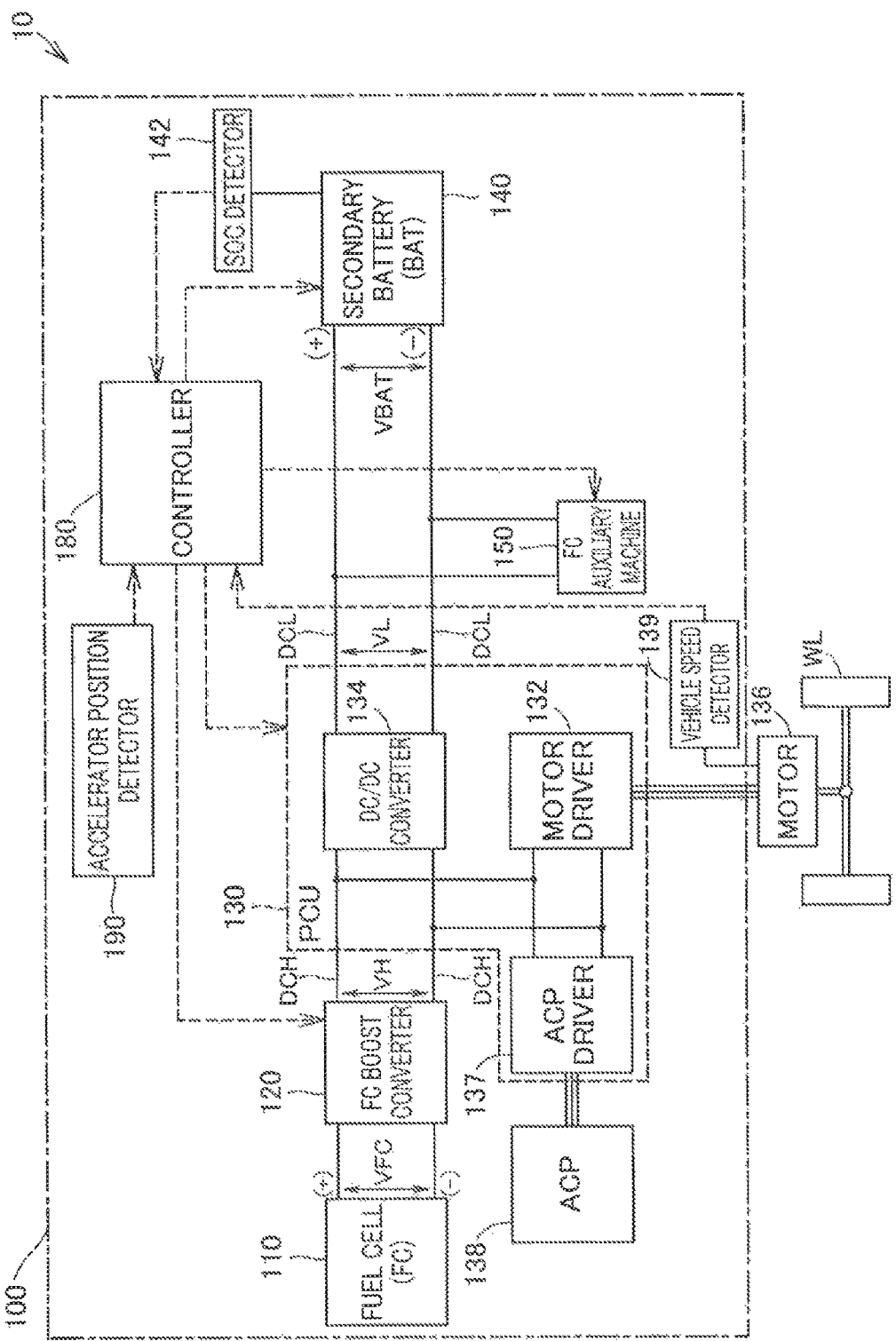
FIG. 1 is a schematic view of a fuel cell vehicle including a fuel cell system according to a first embodiment.

FIG. 1 is a schematic view illustrating a configuration of a fuel cell vehicle 10 including a fuel cell system 100 according to a first embodiment. The fuel cell vehicle 10 includes a fuel cell 110, an FC boost converter 120, a power control unit (PCU) 130, a traction motor 136, an air compressor (ACP) 138, a vehicle speed detector 139, a secondary battery 140, an SOC detector 142, FC auxiliary machine 150, a controller 180, an accelerator position detector 190, and wheels WL. The fuel cell vehicle 10 travels by driving the traction motor 136 by power supplied from the fuel cell 110 and from the secondary battery 140. For example, the fuel cell system 100 includes the functional units of the fuel cell vehicle 10 described above, except for the traction motor 136 and the wheels WL.

The fuel cell 110 is a polymer electrolyte fuel cell that generates power by receiving oxygen and hydrogen as reaction gas. The fuel cell 110 is not limited to the polymer electrolyte fuel cell, and various other types of fuel cells may be employed. The fuel cell 110 is connected to high-voltage DC wiring DCH through the FC boost converter 120 and to a motor driver 132 and an ACP driver 137, in the PCU 130, through the high-voltage DC wiring DCH. The FC boost converter 120 boosts output voltage VFC of the fuel cell 110 to high voltage VH that can be used by the motor driver 132 and the ACP driver 137.

The motor driver 132 is formed of a three-phase inverter circuit, and is connected to the traction motor 136. The motor driver 132 converts output power from the fuel cell 110, supplied through the FC boost converter 120, and output power from the secondary battery 140, supplied through a DC/DC converter 134, into three-phase AC power, and supplies the three-phase AC power to the traction motor 136. The traction motor 136 is formed of a synchronous motor including a three-phase coil, and drives the wheels WL through gears and the like. The traction motor 136 also functions as a power generator that regenerates kinetic energy of the fuel cell vehicle 10 to generate regenerative power, when the fuel cell vehicle 10 is under braking. The vehicle speed detector 139 detects vehicle speed $S_{VHCL}$ [km/h] of the fuel cell vehicle 10, and transmits the vehicle speed $S_{VHCL}$ [km/h] to the controller 180.

The DC/DC converter 134 adjusts a voltage level of the high-voltage DC wiring DCH in accordance with a driving signal from the controller 180, so that the secondary battery 140 switches between charging and discharging states. When the traction motor 136 generates the regenerative power, the motor driver 132 converts the regenerative power into DC power to be charged to the secondary battery 140 through the DC/DC converter 134.

The ACP driver 137 is formed of a three-phase inverter circuit and is connected to an ACP 138. The ACP driver 137 converts output power from the fuel cell 110, supplied through the FC boost converter 120, and output power from the secondary battery 140, supplied through the DC/DC converter 134, into three-phase AC power, and supplies the three-phase AC power to the ACP 138. The ACP 138 is formed of a synchronous motor including a three-phase coil, and drives a motor in accordance with the supplied power, and supplies oxygen (air), used for generating power, to the fuel cell 110. The "ACP 138" corresponds to a "pump".

The secondary battery 140 is a charging device that stores electric energy and can repeatedly perform charging and discharging. The secondary battery 140 may be formed of, for example, a lithium-ion battery. Alternatively, the secondary battery 140 may be other types of batteries such as a lead storage battery, a nickel-cadmium battery, or a nickel-hydrogen battery. The secondary battery 140 is connected to the DC/DC converter 134, in the PCU 130, through low-voltage DC wiring DCL, and is connected to the high-voltage wiring DCH through the DC/DC converter 134.

The SOC detector 142 detects a state of charge (SOC) of the secondary battery 140, and transmits the SOC to the controller 180. In this specification, the "SOC" indicates a ratio of currently remaining battery charge to the maximum charge capacity of the secondary battery 140. The SOC detector 142 detects a temperature Tba, output voltage V, and output current I of the secondary battery 140, and detects the SOC based on the detected values. The SOC detector 142 in the present embodiment also transmits the temperature Tba of the secondary battery 140 to the controller 180.

The FC auxiliary machine 150 is connected to the low-voltage DC wiring DCL, and is driven by power supplied from the fuel cell 110 and the secondary battery 140. The FC auxiliary machine 150 includes auxiliary machines, used for the power generation by the fuel cell 110, such as a fuel pump through which the reaction gas is supplied to the fuel cell 110 and a coolant pump that supplies a coolant to the fuel cell 110. The accelerator position detector 190 detects how much the accelerator is depressed by a driver (accelerator depression amount $D_{ACC}$) [%], and transmits the accelerator depression amount $D_{ACC}$ to the controller 180.

The controller 180 is formed of a microcomputer including a central processing unit and a main memory. Upon detecting an operation such as accelerator operation by the driver, the controller 180 controls the power generation by the fuel cell 110 and the charging/discharging of the secondary battery 140, in accordance with the content of the operation. The controller 180 generates a driving signal corresponding to the accelerator depression amount $D_{ACC}$, and transmits the driving signal to each of the motor driver 132 and the DC/DC converter 134. The motor driver 132 rotationally drives the traction motor 136 in accordance with the accelerator depression amount $D_{ACC}$, by adjusting a pulse width of the AC voltage in accordance with the driving signal from the controller 180 or performing the other like operation. The controller 180 includes a secondary battery assist control map, and determines a secondary battery assist rate by using the map. The secondary battery assist control map indicates a relationship between the temperature and the SOC of the secondary battery 140 and a ratio of power supplied from the secondary battery 140 to power $P_{T/M}$ required for rotationally driving the traction motor 136 in accordance with the accelerator depression amount $D_{ACC}$ (secondary battery assist ratio).

Figure 2:
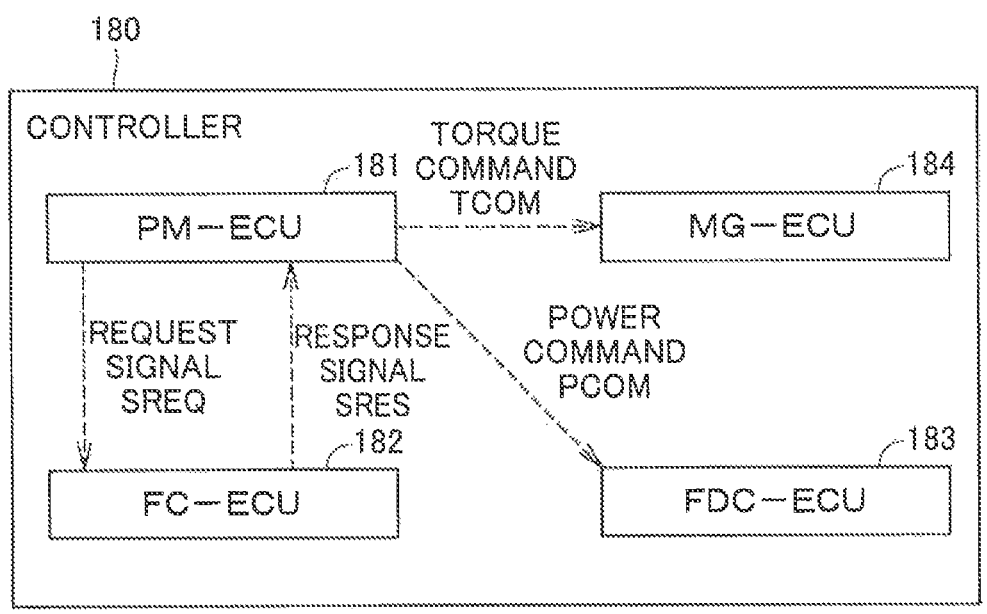
FIG. 2 is a diagram illustrating a configuration of a controller.

FIG. 2 is a diagram illustrating a configuration of the controller 180. The controller 180 includes four electronic control units (ECUs), that is, a PM-ECU 181, an FC-ECU 182, an FDC-ECU 183, and an MG-ECU 184. The PM-ECU 181 acquires the accelerator depression amount $D_{ACC}$ of the fuel cell vehicle 10, and issues to the other ECUs various requests and instructions required for driving the traction motor 136 at the rotational speed corresponding to the accelerator depression amount $D_{ACC}$. The FC-ECU 182 controls the fuel cell 110 and the FC auxiliary machine 150. Upon receiving a request signal SREQ described later from the PM-ECU 181, the FC-ECU 182 issues a response signal SRES, corresponding to the power generation performance and characteristics of the fuel cell 110, to the PM-ECU 181. The FDC-ECU 183 controls the FC boost converter 120. Upon receiving a power command PCOM described later from the PM-ECU 181, the FDC-ECU 183 causes the fuel cell 110 to supply power corresponding to the power command PCOM to the traction motor 136 and the ACP 138. The MG-ECU 184 controls the motor driver 132, the ACP driver 137, and the DC/DC converter 134. Upon receiving a torque command TCOM described later from the PM-ECU 181, the MG-ECU causes the traction motor 136 and the ACP 138 to generate torque corresponding to the torque command TCOM. An example of specific operations performed by the four ECUs is described below.

The PM-ECU 181 receives the accelerator depression amount $D_{ACC}$ detected by the accelerator position detector 190 when the accelerator pedal is depressed by the driver. Upon receiving the accelerator depression amount $D_{ACC}$, the PM-ECU 181 calculates required acceleration torque $T_{ACC}$ [N·m], as a torque amount required for the traction motor 136 in accordance with the accelerator depression amount $D_{ACC}$. The required acceleration torque $T_{ACC}$ can be calculated from a formula representing a relationship between $D_{ACC}$ and $T_{ACC}$ for example. The PM-ECU 181 also calculates required drivability torque $T_{MOD}$ [N·M] from the required acceleration torque $T_{ACC}$. The required drivability torque $T_{MOD}$ is calculated with rate processing (smoothening processing) executed on a change rate $\Delta T_{ACC}$ [N·m/s] of the required acceleration torque $T_{ACC}$ that is equal to or higher than a threshold (rate limiter) $\Delta Tth1$ so that the change rate $\Delta T_{ACC}$ is reduced. The required drivability torque $T_{MOD}$ is set as described above because when the acceleration and deceleration of the fuel cell vehicle 10 is controlled in accordance with the required acceleration torque $T_{ACC}$, comfortability degrades due to sudden acceleration and deceleration. The PM-ECU 181 issues the torque command TCOM, including the calculated required drivability torque $T_{MOD}$, to the MG-ECU 184. Upon receiving the torque command TCOM, including the required drivability torque $T_{MOD}$, the MG-ECU 184 controls the traction motor 136 so that output torque corresponding to the required drivability torque $T_{MOD}$ is generated. The torque actually generated in the traction motor 136 is also referred to as actual torque $T_{ACT}$.

The PM-ECU 181 calculates vehicle required power $P_{VHCL}$ [W] from the calculated required drivability torque $T_{MOD}$. The vehicle required power $P_{VHCL}$ is power required for achieving a driving state of the fuel cell vehicle 10 corresponding to the required drivability torque $T_{MOD}$, and is required generated power of the fuel cell 110. The vehicle required power $P_{VHCL}$ is calculated from the following Formula (1):

$$P_{VHCL}=P_{T/M}+P_{AUX}+P_{CHG} \qquad (1)$$

where $P_{T/M}$ is required driving power [W] of the traction motor 136, $P_{AUX}$ is required driving power [W] of the PC auxiliary machine 150 and the ACP 138, and $P_{CHG}$ is power [W] charged and discharged to and from the secondary battery 140. For example, $P_{T/M}$ can be calculated from a motor characteristic indicating a relationship between rotational speed and required torque of the traction motor 136 and $P_{T/M}$. For example, $P_{AUX}$ can be calculated from a motor characteristic indicating a relationship between $P_{AUX}$ and the rotational speed and the required torque of the motor in the FC auxiliary machine 150 and the ACP 138. For example, $P_{CHG}$ can be calculated from an SOC charge-discharge characteristic and a temperature charge-discharge characteristic of the secondary battery 140. The SOC charge-discharge characteristic is a map in which the SOC of the secondary battery 140 is associated with an allowable input upper limit $W_{in}$ of input (charge) power $P_{in}$ and an allowable output upper limit $W_{out}$ of output (discharge) power $P_{out}$. The temperature charge-discharge characteristic is a map in which the temperature Tba of the secondary battery 140 is associated with the allowable input upper limit $W_{in}$ of the input power and the allowable output upper limit $W_{out}$ of the output power. The PM-ECU 181 can use, as $P_{CHG}$, the smaller one of the allowable input upper limit $W_{in}$, determined from the SOC acquired from the SOC detector 142 and the SOC charge-discharge characteristic, and the allowable input upper limit $W_{in}$ determined from the temperature Tba acquired from the SOC detector 142 and the temperature charge-discharge characteristic. The PM-ECU 181 issues a request signal SREQ, including the calculated vehicle required power $P_{VHCL}$, to the FC-ECU 182. The "vehicle required power $P_{VHCL}$" corresponds to "required generated power of the fuel cell".

Upon receiving the request signal SREQ, including the vehicle required power $P_{VHCL}$, the FC-ECU 182 determines whether the vehicle required power $P_{VHCL}$ exceeds allowable power $P_{ALW}$ [W] of the fuel cell 110. The allowable power $P_{ALW}$ [W] is an upper limit of the power that can be currently generated by the fuel cell 110, and can be calculated from various parameters indicating the current state of the fuel cell 110. The parameters indicating the current state of the fuel cell 110 include, for example, the temperature of the fuel cell 110, an amount of outer air taken in by the ACP 138, an amount of hydrogen remaining in a hydrogen tank that stores hydrogen supplied to the fuel cell 110, anode pressure and cathode pressure of the fuel cell 110, and the like. The FC-ECU 182 can calculate the allowable power $P_{ALW}$ from a map indicating the corresponding relationship between the parameters and the allowable power $P_{ALW}$. When the vehicle required power $P_{VHCL}$ does not exceed the allowable power $P_{ALW}$, the FC-ECU 182 issues, a response signal SRES including a current value I [A] and a voltage value V [V] corresponding to the vehicle required power $P_{VHCL}$, to the PM-ECU 181. The current value I and the voltage value V corresponding to the vehicle required power $P_{VHCL}$ can be respectively calculated from a power-current characteristic (P-I characteristic) and a current-voltage characteristic (I-V characteristic) of the fuel cell 110. When the vehicle required power $P_{VHCL}$ exceeds the allowable power $P_{ALW}$, the FC-ECU 182 issues the response signal SRES, including the current value I and the voltage value V corresponding to the allowable power $P_{ALW}$, to the PM-ECU 181.

Upon receiving the response signal SRES, including the current value I and the voltage value V corresponding to the vehicle required power $P_{VHCL}$ or the allowable power $P_{ALW}$, the PM-ECU 181 issues the power command PCOM corresponding to the current value I and the voltage value V that have been received to the FDC-ECU 183. Upon receiving the power command PCOM, the FDC-ECU 183 controls the FC boost converter 120 so that the fuel cell 110 outputs the current value I and the voltage value V corresponding to the power command PCOM. The power actually output by the fuel cell 110 is also referred to as FC generated power $P_{FC}$.

The PM-ECU 181 calculates ACP required driving power $P_{RQ}$ [W] from the required acceleration torque $T_{ACC}$. The ACP required driving power $P_{RQ}$ is power required to achieve a driving state of the ACP 138 corresponding to the required acceleration torque $T_{ACC}$, and can be calculated from a formula indicating the relationship between $T_{ACC}$ and $P_{RQ}$, for example. The PM-ECU 181 issues the request signal SREQ including the calculated ACP required driving power $P_{RQ}$ to the FC-ECU 182. The "ACP required driving power $P_{RQ}$" corresponds to "required driving power".

Upon receiving the request signal SREQ including the ACP required driving power $P_{RQ}$, the FC-ECU 182 calculates a rotational speed (required rotational speed) $R_{RQ}$ [rpm] of the ACP 138 corresponding to the ACP required driving power $P_{RQ}$. For example, the required rotational speed $R_{RQ}$ can be calculated as follows. First of all, the current value I for causing the fuel cell 110 to generate the ACP required driving power $P_{RQ}$, is calculated from the value of the ACP required driving power $P_{RQ}$ and the P-I characteristics and the I-V characteristics of the fuel cell 110. Then, an oxygen amount for generating the ACP required driving power $P_{RQ}$, is calculated from a charge amount corresponding to the calculated current value I and an electrochemical reaction formula for power generation. An air amount for generating the ACP required driving power $P_{RQ}$ is calculated from the calculated oxygen amount and a component ratio of air, and the required rotational speed $R_{RQ}$ of the ACP 138 is calculated from the calculated air amount. The FC-ECU 182 issues the response signal SRES including the calculated required rotational speed $R_{RQ}$ to the PM-ECU 181.

Upon receiving the response signal SRES including the required rotational speed $R_{RQ}$, the PM-ECU 181 calculates ACP required torque $T_{ACP}$ [N·m] from the required rotational speed $R_{RQ}$. The PM-ECU 181 issues a torque command TCOM including the calculated ACP required torque $T_{ACP}$ to the MG-ECU 184. Upon receiving the torque command TCOM including the ACP required torque $T_{ACP}$, the MG-ECU 184 controls the ACP 138 so that output torque corresponding to the ACP required torque $T_{ACP}$ is generated.

As described above, the PM-ECU 181 according to the present embodiment calculates the vehicle required power $P_{VHCL}$ from the required drivability torque $T_{MOD}$, and calculates the ACP required driving power $P_{RQ}$ from the required acceleration torque $T_{ACC}$. In this configuration, when the calculated vehicle required power $P_{VHCL}$, that is, the required generated power of the fuel cell 110 sharply drops, the ACP required driving power $P_{RQ}$ drops at a drop rate higher than a drop rate of the required generated power (vehicle required power $P_{VHCL}$). Thus, the dry up of the fuel cell 110 can be prevented and the degradation of the fuel efficiency due to excessively generated power can be reduced when the vehicle required power $P_{VHCL}$ sharply drops. More specifically, because of the slow response of the ACP 138 due to the inertia, oxygen is supplied to the fuel cell 110 until the ACP 138 is stopped even after the ACP required driving power $P_{RQ}$ is reduced to 0 when the vehicle required power $P_{VHCL}$ has sharply dropped. This excessive oxygen supply leads to the dry up of the fuel cell 110 and the excessive power generation. By setting the drop rate of the ACP required driving power $P_{RQ}$ to be higher than the drop rate of the vehicle required power $P_{VHCL}$, the delayed supplied amount of oxygen from the ACP 138 for the ACP required driving power $P_{RQ}$ becomes close to the air amount required for the vehicle required power $P_{VHCL}$ at that point. Thus, the oxygen is prevented from being excessively supplied after the vehicle required power $P_{VHCL}$ is reduced to 0, whereby the dry up of the fuel cell 110 can be prevented and the excessive power generation can be reduced. The PM-ECU 181 according to the present embodiment performs control (required driving power lower limit setting control) for setting a lower limit $PL_{RQ}$ as a guard value for the calculated ACP required driving power $P_{RQ}$, when the vehicle required power $P_{VHCL}$ sharply drops.

Figure 3:
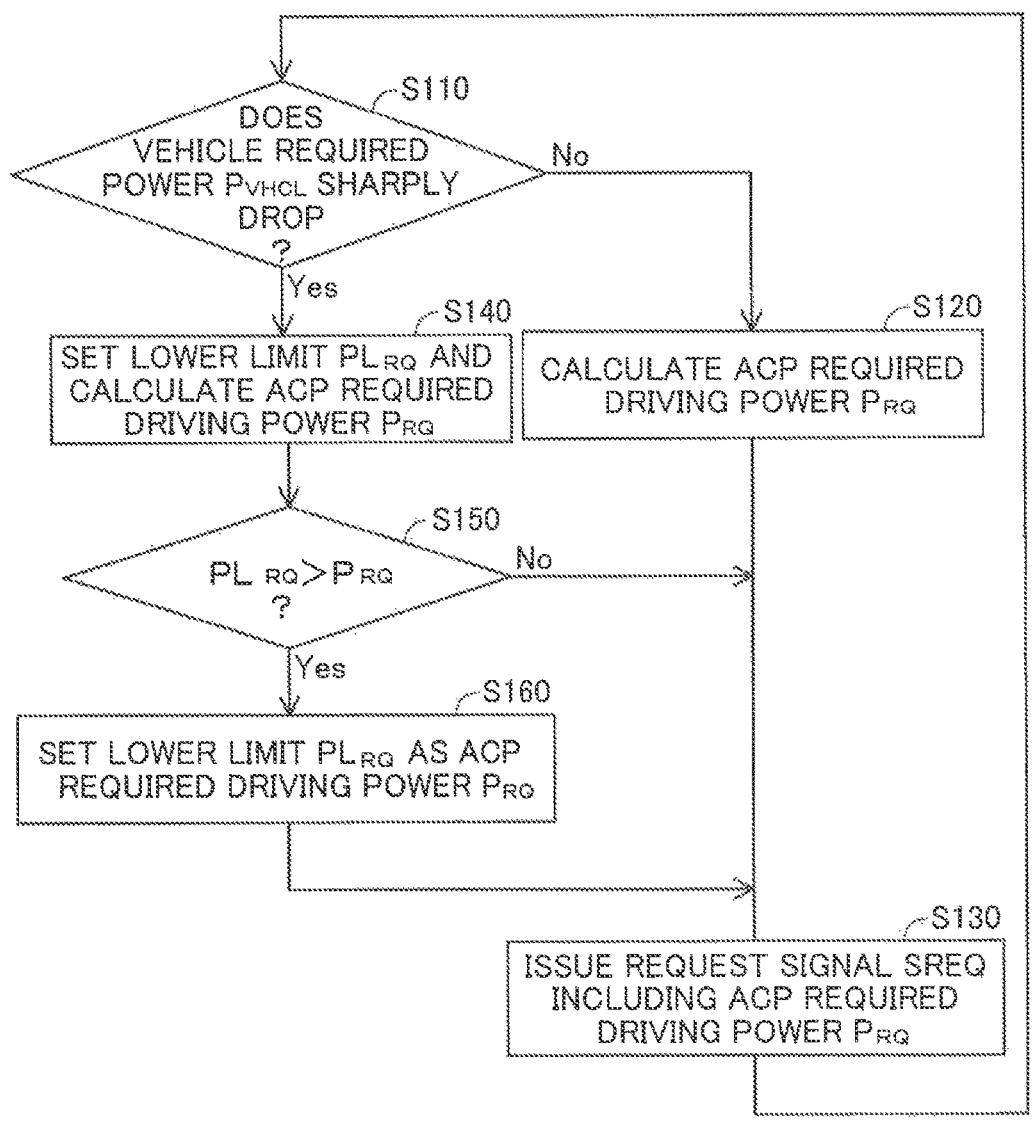
FIG. 3 is a flowchart illustrating required driving power lower limit setting control.

FIG. 3 is a flowchart illustrating the required driving power lower limit setting control. First of all, the PM-ECU 181 determines whether the vehicle required power $P_{VHCL}$ sharply drops (step S110). To determine whether the vehicle required power $P_{VHCL}$ sharply drops, whether a preset condition of causing a sharp drop in the vehicle required power $P_{VHCL}$ is satisfied is determined. Here, the preset condition is a drop rate $|\Delta D_{ACC}|$ (0>$\Delta D_{ACC}$ [%/s]) of the accelerator depression amount $D_{ACC}$ per unit time being equal to or higher than a threshold $\Delta Dth$ (for example, 5 [%/s]) ($|\Delta D_{ACC}| \geq \Delta Dth$). As the "preset condition", any condition under which the vehicle required power $P_{VHCL}$ is supposed to sharply drop may be set. For example, as such a condition, a drop rate $|\Delta T_{ACC}|$ of the required acceleration torque $T_{ACC}$ per unit time being a threshold $\Delta Tth2$ or higher may be set. The "threshold $\Delta Dth$" corresponds to a "first threshold".

When the drop rate $|\Delta D_{ACC}|$ of the accelerator depression amount $T_{ACC}$ per unit time is lower than the threshold $\Delta Dth$ ($|\Delta D_{ACC}| < \Delta Dth$), the vehicle required power $P_{VHCL}$ does not sharply drop (step S110: No), and thus the PM-ECU 181 does not set the lower limit $PL_{RQ}$. Here, the PM-ECU 181 calculates, as the normal driving state, the ACP required driving power $P_{RQ}$ from the required acceleration torque $T_{ACC}$ (step S120), and issues the request signal SREQ including the calculated ACP required driving power $P_{RQ}$ to the FC-ECU 182 (step S130).

When the drop rate of the accelerator depression amount $D_{ACC}$ per unit time is equal to or higher than a threshold $\Delta Dth$ ($|\Delta D_{ACC}| \geq \Delta Dth$), the vehicle required power $P_{VHCL}$ sharply drops (step S110: Yes), and thus the PM-ECU 181 sets the lower limit $PL_{RQ}$ and then calculates the ACP required driving power $P_{RQ}$ (step S140). The lower limit $PL_{RQ}$ may be a preset fixed value, or may be a variable value that changes in accordance with the states of the fuel cell system 100 and the secondary battery 140. For example, the lower limit $PL_{RQ}$ may be calculated with a formula indicating the relationship between the allowable output upper limit $W_{out}$ of the output power of the secondary battery 140 and the lower limit $PL_{RQ}$. The PM-ECU 181 determines whether the ACP required driving power $P_{RQ}$, calculated from the required acceleration torque $T_{ACC}$, is lower than the lower limit $PL_{RQ}$ (step S150).

When the ACP required driving power $P_{RQ}$, calculated from the required acceleration torque $T_{ACC}$, is lower than the lower limit $PL_{RQ}$, the PM-ECU 181 sets the lower limit $PL_{RQ}$ as the value of the ACP required driving power $P_{RQ}$ (step S160). Thus, a configuration is established where the ACP required driving power $P_{RQ}$ output from the PM-ECU 181 is not reduced below the lower limit $PL_{RQ}$. Then, the PM-ECU 181 issues the request signal SREQ, including the ACP required driving power $P_{RQ}$ as a value equal to the lower limit $PL_{RQ}$, to the FC-ECU 182 (step S130). The PM-ECU 181 issues the torque command TCOM, including the required rotational speed $R_{RQ}$ corresponding to the lower limit $PL_{RQ}$, to the MG-ECU 184. Thus, the MG-ECU 184 controls the ACP 138 so that the output torque corresponding to the lower limit $PL_{RQ}$ is generated. When the ACP required driving power $P_{RQ}$, calculated from the required acceleration torque $T_{ACC}$, is not lower than the lower limit $PL_{RQ}$, the PM-ECU 181 issues a request signal SREQ, including the calculated ACP required driving power $P_{RQ}$, to the FC-ECU 182 (step S130).

Figure 4:
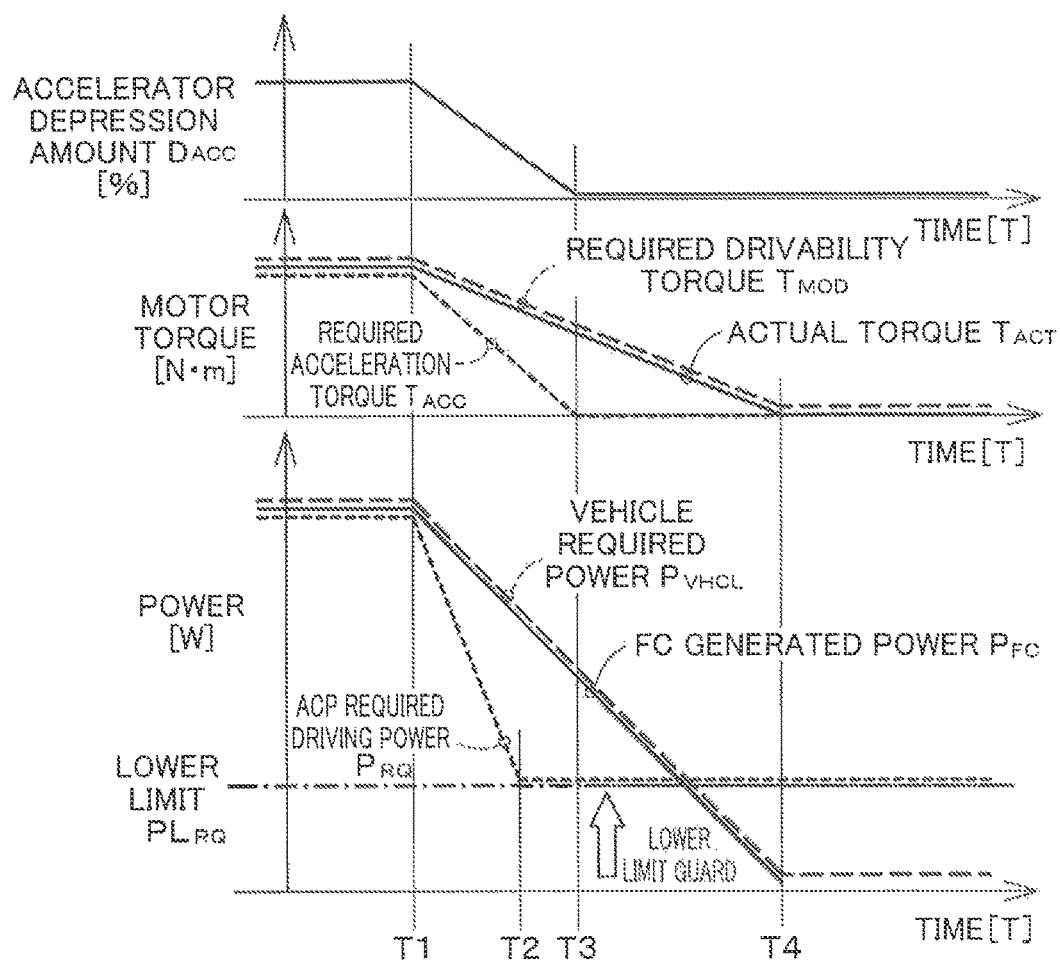
FIG. 4 is a timing chart exemplarily illustrating a state of the fuel cell vehicle according to the first embodiment.

FIG. 4 is a timing chart of exemplarily illustrating a state of the fuel cell vehicle 10 according to the present embodiment. FIG. 4 exemplarily illustrates how the accelerator depression amount $D_{ACC}$, the required acceleration torque $T_{ACC}$, the required drivability torque $T_{MOD}$, the actual torque $T_{ACT}$, the vehicle required power $P_{VHCL}$, the FC generated power $P_{FC}$, and the ACP required driving power $P_{RQ}$ change over time. Furthermore, the lower limit $PL_{RQ}$ is exemplarily illustrated in FIG. 4. In a case described below, it is assumed that the driver starts to turn OFF the accelerator at a time point T1 and the accelerator is completely turned OFF at a time point T3. Furthermore, in the case described below, it is assumed that the drop rate $|\Delta D_{ACC}|$ of the accelerator depression amount $D_{ACC}$ is equal to or higher than the threshold $\Delta Dth$ ($|\Delta D_{ACC}| \geq \Delta Dth$) in a period between T1 and T3. In the case described below, it is assumed that the value of the ACP required driving power $P_{RQ}$ calculated from the required acceleration torque $T_{ACC}$ becomes lower than the lower limit $PL_{RQ}$ at a time point T2.

The required acceleration torque $T_{ACC}$ corresponds to the accelerator depression amount $D_{ACC}$ and thus starts to drop at the time point T1 to be 0 at the time point T3. Due to the rate processing on the change rate of the required acceleration torque $T_{ACC}$, the required drivability torque $T_{MOD}$ drops more gently than the required acceleration torque $T_{ACC}$. Similarly, the vehicle required power $P_{VHCL}$, the FC generated power $P_{FC}$, and the actual torque $T_{ACT}$ correspond to the required drivability torque $T_{MOD}$ and thus drops gently in a period between T1 and T4. The ACP required driving power $P_{RQ}$ corresponds to the required acceleration torque $T_{ACC}$ and thus drops during the period between T1 and T3. The value of the ACP required driving power $P_{RQ}$ is the lower limit $PL_{RQ}$ at and after the time point T2. Thus, the ACP 138 continues to be driven in accordance with the lower limit $PL_{RQ}$ of the ACP required driving power $P_{RQ}$ at and after the time point T2.

Figure 5:
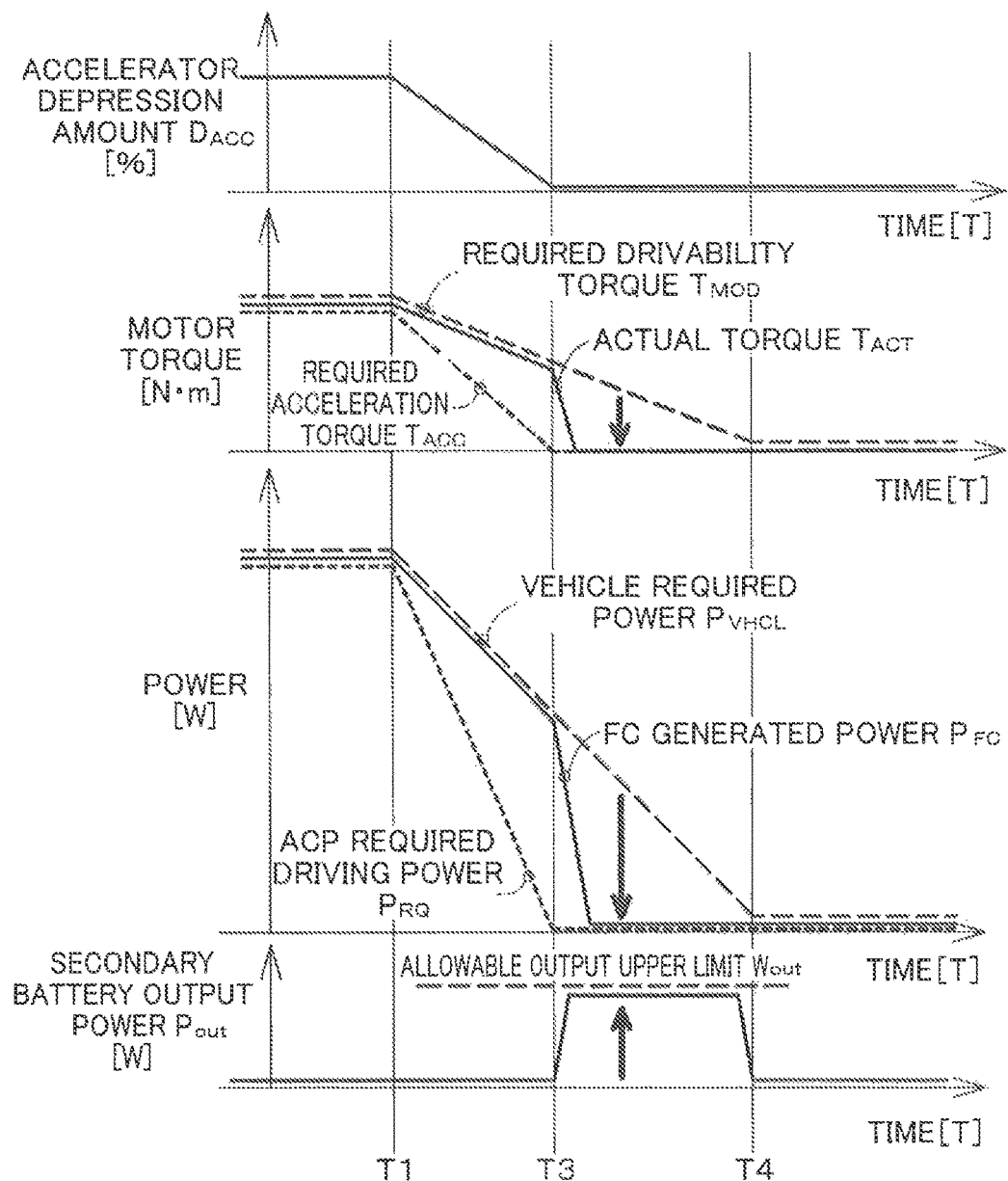
FIG. 5 is a timing chart exemplarily illustrating a state of a fuel cell vehicle according to a comparative example.

FIG. 5 is a timing chart exemplarily illustrating a state of a fuel cell vehicle according to a comparative example. As in FIG. 4, FIG. 5 exemplarily illustrates how the accelerator depression amount $D_{ACC}$, the required acceleration torque $T_{ACC}$, the required drivability torque $T_{MOD}$, the actual torque $T_{ACT}$, the vehicle required power $P_{VHCL}$, the FC generated power $P_{FC}$, and the ACP required driving power $P_{RQ}$ change over time. FIG. 5 further exemplarily illustrates how the output power $P_{out}$ of the secondary battery 140 changes overtime, and exemplarily illustrates the allowable output upper limit $W_{out}$ of the output power $P_{out}$. The allowable output upper limit $W_{out}$ in this example is the smaller one of the allowable output upper limit $W_{out}$, obtained from the SOC acquired from the SOC detector 142 and the SOC charge-discharge characteristic, and the allowable output upper limit $W_{out}$, obtained from the temperature Tba acquired from the SOC detector 142 and the temperature charge-discharge characteristic.

The fuel cell vehicle according to the comparative example is the same as the fuel cell vehicle 10 according to the present embodiment, except that the required driving power lower limit setting control is not executed. In a case described below, it is assumed that the driver starts to turn OFF the accelerator at the time point T1 and the accelerator is completely turned OFF at the time point T3, as in FIG. 4. When the driver turns OFF the accelerator, the required acceleration torque $T_{ACC}$, the required drivability torque $T_{MOD}$, and the vehicle required power $P_{VHCL}$ drop in manners similar to those in the present embodiment.

With no lower limit $PL_{RQ}$ set, the ACP required driving power $P_{RQ}$ drops in the period between T1 and T3 to be 0 at the time point T3. When the ACP required driving power $P_{RQ}$ drops to 0, the ACP 138 stops, and thus oxygen (air) is no longer supplied to the fuel cell 110. As a result, the power generation stops due to the lack of oxygen (air deficiency) and thus the FC generated power $P_{FC}$ drops to 0. When the FC generated power $P_{FC}$ is lower than the vehicle required power $P_{VHCL}$, the output power $P_{out}$ from the secondary battery 140 is supplied to the traction motor 136 to compensate for the shortage. However, when the SOC of the secondary battery 140 is low because the vehicle is traveling on a highway, or when the temperature of the secondary battery 140 is low, the compensation of the shortage fails due to the low allowable output upper limit $W_{out}$. Thus, the vehicle fails in a state (torque shock) where the actual torque $T_{ACT}$ of the traction motor 136 sharply drops and the acceleration sharply drops. In the fuel cell vehicle 10 according to the present embodiment where the required driving power lower limit setting control is performed as described above, the air (oxygen) can be supplied to the fuel cell 110 at an after the time point T3. Thus, the fuel cell 110 can continue the power generation, whereby the torque shock due to the air deficiency can be prevented.

In the fuel cell vehicle 10 according to the present embodiment described above, the ACP required driving power $P_{RQ}$ drops at a higher drop rate than the drop rate of the required generated power when the required generated power (vehicle required power $P_{VHCL}$) sharply drops. Thus, the dry up of the fuel cell 110 can be prevented, and the degradation of the fuel efficiency due to the excessive power generation can be reduced. When the ACP required driving power $P_{RQ}$, calculated from the required acceleration torque $T_{ACC}$, is lower than the lower limit $PL_{RQ}$, the ACP 138 is driven in accordance with the lower limit $PL_{RQ}$. Thus, the fuel cell 110 can be prevented from falling in the power generation disabled state due to the lack of oxygen.

B. Second Embodiment

Figure 6:
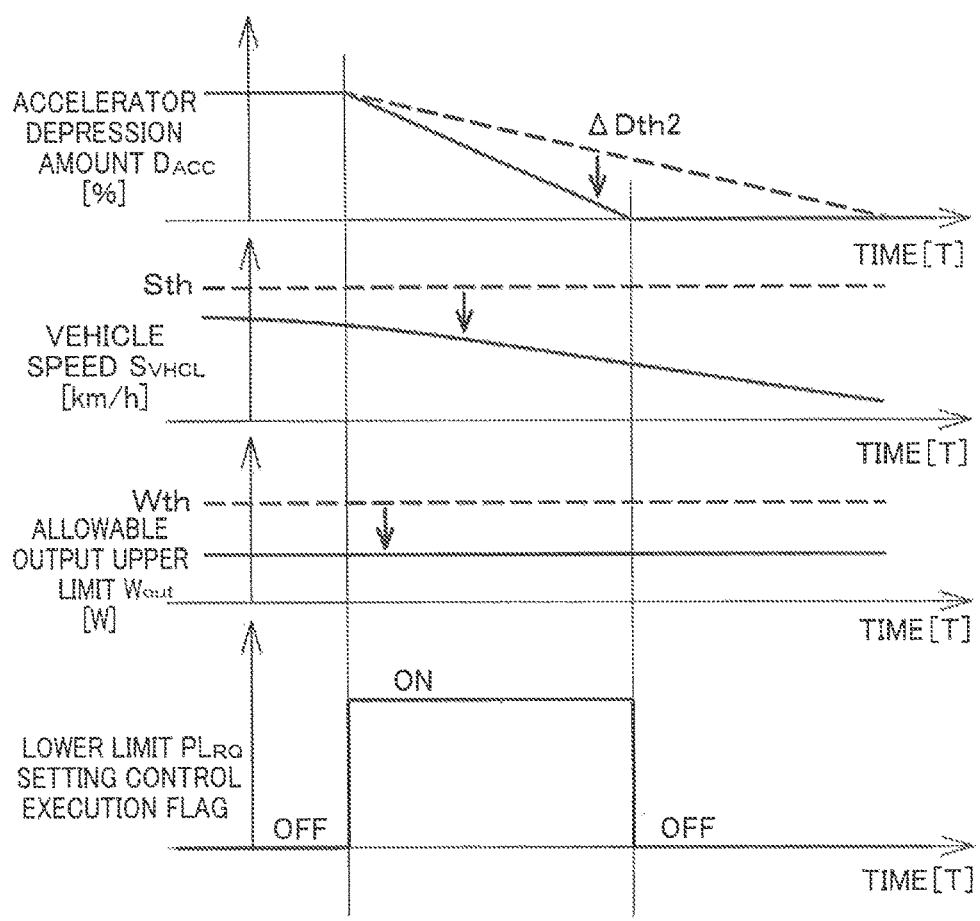
FIG. 6 is a timing chart exemplarily illustrating a state of a fuel cell vehicle according to a second embodiment.

FIG. 6 is a timing chart exemplarily illustrating a state of a fuel cell vehicle 10A according to a second embodiment. FIG. 6 exemplarily illustrates how the accelerator depression amount $D_{ACC}$, the vehicle speed $S_{VHCL}$, the allowable output upper limit $W_{out}$ of the output power $P_{out}$ of the secondary battery 140, and an ON/OFF state of a required driving power lower limit setting control execution flag change over time. The fuel cell vehicle 10A according to the second embodiment is the same as the fuel cell vehicle 10 according to the first embodiment, except for the content of the "preset condition" in step S110 in the required driving power lower limit setting control (FIG. 3). The "preset condition" for the fuel cell vehicle 10A according to the second embodiment is the drop rate $|\Delta D_{ACC}|(0 > \Delta D_{ACC})$ of the accelerator depression amount $D_{ACC}$ per unit time being equal to or higher than a threshold $\Delta Dth2$ (for example, 5 [%/s]), the vehicle speed $S_{VHCL}$ of the fuel cell vehicle 10A being equal to or lower than a threshold Sth (for example, 60 [km/h]), and the allowable output upper limit $W_{out}$ of the output power $P_{out}$ of the secondary battery 140 being equal to or lower than a threshold Wth [W]. The allowable output upper limit $W_{out}$ is the smaller one of the allowable output upper limit $W_{out}$, obtained from the SOC charge-discharge characteristic, and the allowable output upper limit $W_{out}$, obtained from the temperature charge-discharge characteristic, as in the first embodiment. The "threshold $\Delta Dth2$" corresponds to a "second threshold", the "threshold Sth" corresponds to a "third threshold", and the "threshold Wth" corresponds to a "fourth threshold".

In this configuration, the lower limit $PL_{RQ}$ of the ACP required driving power $P_{RQ}$ is set only when the secondary battery 140 can supply a small amount of output power $P_{out}$ to the traction motor 136, and thus is likely to fail to fully compensate for the shortage, that is, when the torque shock is likely to occur. When a sufficient amount of output power $P_{out}$ can be supplied from the secondary battery 140 to the traction motor 136, the lower limit $PL_{RQ}$ of the ACP required driving power $P_{RQ}$ is not set because the torque shock is less likely to occur. Thus, the lower limit $PL_{RQ}$ of the ACT required driving power $P_{RQ}$ is prevented from being set when not required.

C. Third Embodiment

Figure 7:
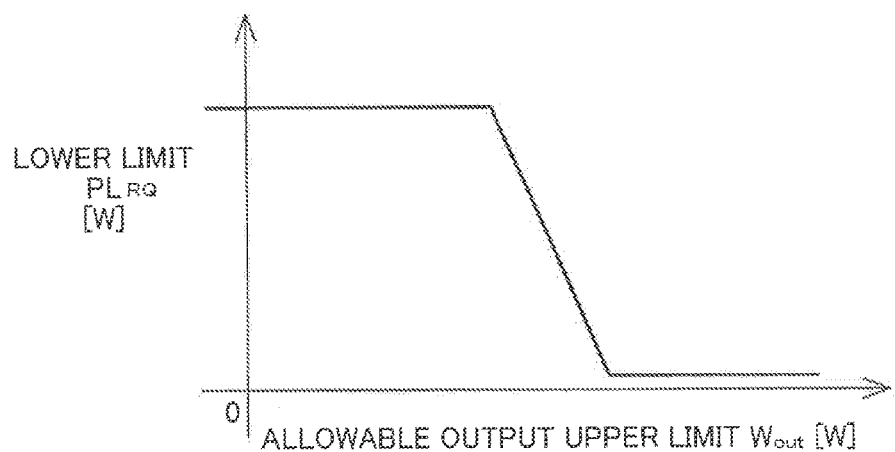
FIG. 7 is a schematic diagram exemplarily illustrating a relationship between $W_{out}$ and $PL_{RQ}$ according to a third embodiment.

FIG. 7 is a schematic view exemplarily illustrating a relationship between the allowable output upper limit $W_{out}$ of the output power $P_{out}$ of the secondary battery 140 and the lower limit $PL_{RQ}$ of the ACP required driving power $P_{RQ}$, according to a third embodiment. The fuel cell vehicle 10B according to the third embodiment is the same as the fuel cell vehicle 10 according to the first embodiment except for how the lower limit $PL_{RQ}$ is set. The lower limit $PL_{RQ}$ according to the third embodiment is a variable value corresponding to values of the allowable output upper limit $W_{out}$ and the vehicle required power $P_{VHCL}$. The allowable output upper limit $W_{out}$ according to the third embodiment is the smaller one of the allowable output upper limit $W_{out}$, obtained from the SOC charge-discharge characteristic, and the allowable output upper limit $W_{out}$, obtained from the temperature charge-discharge characteristic, as in the first embodiment. The PM-ECU 181 according to the third embodiment has a map corresponding to FIG. 7. How the PM-ECU 181 according to the third embodiment calculates the lower limit $PL_{RQ}$ is described below.

Figure 8:
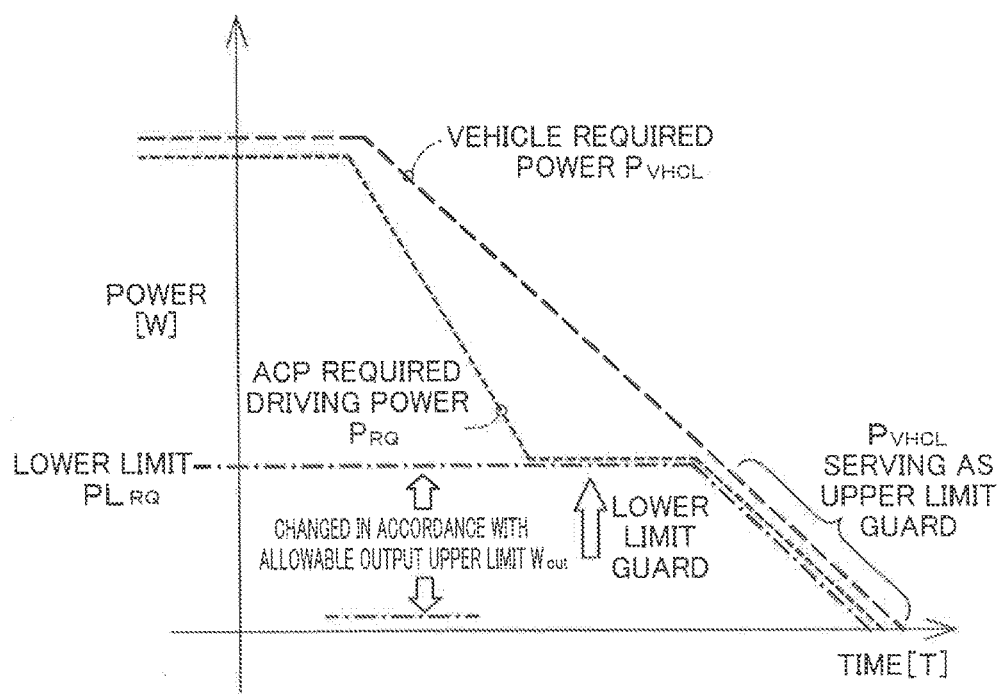
FIG. 8 is a timing chart exemplarily illustrating a state of a fuel cell vehicle according to the third embodiment.

FIG. 8 is a timing chart of exemplarily illustrating a state of the fuel cell vehicle 10B according to the third embodiment. FIG. 8 exemplarily illustrates how the vehicle required power $P_{VHCL}$ and the ACP required driving power $P_{RQ}$ change over time. FIG. 8 illustrates the lower limit $PL_{RQ}$ of the ACP required driving power $P_{RQ}$. The PM-ECU 181 according to the third embodiment calculates the lower limit $PL_{RQ}$ in step S140 in the required driving power lower limit setting control (FIG. 3). More specifically, the PM-ECU 181 calculates the allowable output upper limit $W_{out}$ from the SOC acquired from the SOC detector 142, the SOC charge-discharge characteristic, the temperature Tba acquired from the SOC detector 142, and the temperature charge-discharge characteristic, and calculates the lower limit $PL_{RQ}$ from the allowable output upper limit $W_{out}$ and the map illustrated in FIG. 7. Then, the PM-ECU 181 determines whether the calculated lower limit $PL_{RQ}$ is higher than the vehicle required power $P_{VHCL}$. When the calculated lower limit $PL_{RQ}$ is not higher than the vehicle required power $P_{VHCL}$, the PM-ECU 181 compares the lower limit $PL_{RQ}$, calculated from the map in FIG. 7, with the ACP required driving power $P_{RQ}$ (step S150 in FIG. 3). When the calculated lower limit $PL_{RQ}$ is higher than the vehicle required power $P_{VHCL}$, the PM-ECU 181 sets the value of the vehicle required power $P_{VHCL}$ as the lower limit $PL_{RQ}$. Thus, the value of the vehicle required power $P_{VHCL}$ serves as an upper limit (guard value) of the lower limit $PL_{RQ}$.

In this configuration, the lower limit $PL_{RQ}$ of the ACP required driving power $P_{RQ}$ can be changed in accordance with the magnitude of the output power $P_{out}$ that can be supplied from the secondary battery 140 to the traction motor 136. Thus, the fuel cell 110 can be more effectively prevented from falling in the power generation disabled state due to the lack of oxygen. The lower limit $PL_{RQ}$ can be changed in accordance with the magnitude of the vehicle required power $P_{VHCL}$ of the fuel cell 110. Thus, excessive supplying of oxygen to the fuel cell 110 can be prevented when the ACP 138 is driven in accordance with the lower limit $PL_{RQ}$.

D. Modifications

The present invention is not limited to the embodiments and can be implemented in various forms without departing from the gist of the present invention. For example, a part or the whole of the functions and processing performed by the controller 180 in the embodiments can be implemented by software or hardware. Examples of the hardware include various types of circuits (circuitry) such as an integrated circuit, a discrete circuit, or a circuit module incorporating these circuits in combination. The following modifications are also applicable.

D-1. Modification 1

In the first to the third embodiments, the allowable output upper limit $W_{out}$ of the output power $P_{out}$ of the secondary battery 140 is the smaller one of the allowable output upper limit $W_{out}$, obtained from the SOC charge-discharge characteristic, and the allowable output upper limit $W_{out}$, obtained from the temperature charge-discharge characteristic. Alternatively, the allowable output upper limit $W_{out}$ may be the larger one of the allowable output upper limit $W_{out}$, obtained from the SOC charge-discharge characteristic, and the allowable output upper limit $W_{out}$, obtained from the temperature charge-discharge characteristic. Thus, the allowable output upper limit $W_{out}$ may be calculated from any one of the SOC charge-discharge characteristic and the temperature charge-discharge characteristic.

D-2. Modification 2

In the first to the third embodiments, oxygen is supplied to the fuel cell 110 from the air compressor (ACP) 138. Alternatively a pump other than the air compressor may be used to supply oxygen to the fuel cell 110. In the first to the third embodiments, the ACP required driving power $P_{RQ}$ is power required to achieve the driving state of the ACP 138 corresponding to the required acceleration torque $T_{ACC}$. The ACP required driving power $P_{RQ}$ may include power different from the driving power for the ACP 138 such as valve driving power.

What is claimed is:

1. A fuel cell system installed in a vehicle, the fuel cell system comprising:
    a fuel cell configured to supply power to a motor that drives the vehicle;
    a pump configured to supply oxygen to the fuel cell;
    an accelerator position detector configured to detect an accelerator depression amount of the vehicle;
    a secondary battery configured to supply power to the motor;
    a state of charge detector configured to detect a temperature and a state of charge of the secondary battery; and
    a controller configured to calculate required generated power of the fuel cell and required driving power of the pump, based on the accelerator depression amount, wherein
    when a preset condition of causing a sharp drop in the calculated required generated power is satisfied, the controller is configured to calculate the required driving power in such a manner that a drop rate of the required driving power becomes higher than a drop rate of the calculated required generated power, set a lower limit to the calculated required driving power, and drive the pump in accordance with the lower limit when the calculated required driving power is lower than the lower limit,
    the controller is configured to calculate an allowable output upper limit of the secondary battery based on at least one of the temperature and the state of charge of the secondary battery,
    the controller is configured to calculate the lower limit of the required driving power based on the allowable output upper limit and the required generated power of the fuel cell, and
    the preset condition is a drop rate of the accelerator depression amount being equal to or higher than a first threshold.

2. A fuel cell system installed in a vehicle, the fuel cell system comprising:
    a fuel cell configured to supply power to a motor that drives the vehicle;
    a pump configured to supply oxygen to the fuel cell;
    an accelerator position detector configured to detect an accelerator depression amount of the vehicle;
    a controller configured to calculate required generated power of the fuel cell and required driving power of the pump, based on the accelerator depression amount;
    a secondary battery configured to supply power to the motor;
    a vehicle speed detector configured to detect vehicle speed of the vehicle; and
    a state of charge detector configured to detect a temperature and a state of charge of the secondary battery, wherein
    when a preset condition of causing a sharp drop in the calculated required generated power is satisfied, the controller is configured to calculate the required driving power in such a manner that a drop rate of the required driving power becomes higher than a drop rate of the calculated required generated power, set a lower limit to the calculated required driving power, and drive the pump in accordance with the lower limit when the calculated required driving power is lower than the lower limit,
    the controller is configured to calculate an allowable output upper limit of the secondary battery based on at least one of the temperature and the state of charge of the secondary battery, and
    the preset condition is a drop rate of the accelerator depression amount being equal to or higher than a second threshold, the vehicle speed being equal to or lower than a third threshold, and the allowable output upper limit being equal to or lower than a fourth threshold.

3. A vehicle comprising:
    the fuel cell system in accordance with claim 1; and
    a motor configured to drive the vehicle with power supplied from the fuel cell system.

4. A method for controlling a fuel cell system installed in a vehicle, the fuel cell system including a fuel cell configured to supply power to a motor that drives the vehicle, a pump configured to supply oxygen to the fuel cell, an accelerator position detector configured to detect an accelerator depression amount of the vehicle, a secondary battery configured to supply power to the motor, a state of charge detector configured to detect a temperature and a state of charge of the secondary battery, and
    a controller configured to calculate required generated power of the fuel cell and required driving power of the pump, based on the accelerator depression amount, wherein
    when a preset condition of causing a sharp drop in the calculated required generated power is satisfied, the controller is configured to calculate the required driving power in such a manner that a drop rate of the required driving power becomes higher than a drop rate of the calculated required generated power, set a lower limit to the calculated required driving power, and drive the pump in accordance with the lower limit when the calculated required driving power is lower than the lower limit, the method comprising:
    detecting, via the accelerator position detector, the accelerator depression amount of the vehicle, and calculating, via the controller, the required generated power of the fuel cell and the required driving power of the pump based on the accelerator depression amount;
    calculating, via the controller, when the preset condition of causing the sharp drop in the calculated required generated power is satisfied, the required driving power in such a manner that the drop rate of the required driving power becomes higher than the drop rate of the calculated required generated power, setting the lower limit to the calculated required driving power, and driving the pump in accordance with the lower limit when the calculated required driving power is lower than the lower limit;
    calculating, via the controller, an allowable output upper limit of the secondary battery based on at least one of the temperature and the state of charge of the secondary battery; and
    calculating, via the controller, the lower limit of the required driving power based on the allowable output upper limit and the required generated power of the fuel cell, wherein
    the preset condition is a drop rate of the accelerator depression amount being equal to or higher than a first threshold.

5. A method for controlling a fuel cell system installed in a vehicle, the fuel cell system comprising a fuel cell configured to supply power to a motor that drives the vehicle, a pump configured to supply oxygen to the fuel cell, an accelerator position detector configured to detect an accelerator depression amount of the vehicle, a secondary battery configured to supply power to the motor, a state of charge detector configured to detect a temperature and a state of charge of the secondary battery, and a controller configured to calculate required generated power of the fuel cell and required driving power of the pump, based on the accelerator depression amount, wherein when a preset condition of causing a sharp drop in the calculated required generated power is satisfied, the controller is configured to calculate the required driving power in such a manner that a drop rate of the required driving power becomes higher than a drop rate of the calculated required generated power, set a lower limit to the calculated required driving power, and drive the pump in accordance with the lower limit when the calculated required driving power is lower than the lower limit, the method comprising:

detecting, via the accelerator position detector, the accelerator depression amount of the vehicle, and calculating, via the controller, the required generated power of the fuel cell and the required driving power of the pump based on the accelerator depression amount;

calculating, via the controller, when the preset condition of causing the sharp drop in the calculated required generated power is satisfied, the required driving power in such a manner that the drop rate of the required driving power becomes higher than the drop rate of the calculated required generated power, setting the lower limit to the calculated required driving power, and driving the pump in accordance with the lower limit when the calculated required driving power is lower than the lower limit;

detecting, via the state of charge detector, the temperature and the state of charge of the secondary battery; and calculating, via the controller, an allowable output upper limit of the secondary battery based on at least one of the temperature and the state of charge of the secondary battery, wherein the preset condition is a drop rate of the accelerator depression amount being equal to or higher than a second threshold, the vehicle speed being equal to or lower than a third threshold, and the allowable output upper limit being equal to or lower than a fourth threshold.

6. A vehicle comprising:

the fuel cell system in accordance with claim 2; and a motor configured to drive the vehicle with power supplied from the fuel cell system.

\* \* \* \* \*